Sept. 5, 1950 C. J. McDOWALL ET AL 2,521,239
MARINE GEAR
Filed July 26, 1947 5 Sheets-Sheet 1

Inventors
Charles J. McDowall,
John E. Storer Jr. &
Elmer A. Richards
By Spencer Willits, Helwig & Baillio
Attorneys Patented Sept. 5, 1950

2,521,239

UNITED STATES PATENT OFFICE 2,521,239

MARINE GEAR

Charles J. McDowall, John E. Storer, Jr., and Elmer A. Richards, Indianapolis, Ind., assignors to General Motors Corporation, Detroit, Mich., a corporation of Delaware Application July 26, 1947, Serial No. 763,790

35 Claims. (Cl. 74—752)

The present invention relates to marine drive gearing for providing smooth drive ratio change between a marine engine and propeller drive mechanism, and more particularly therein to planetary change gear actuated by disc clutches and brakes energised by fluid pressure means, controlled by pressure regulation means which guard against load stalling of the engine under heavy pulling and which assist in drive change by providing full and quick release of one drive means when another is to be connected.

Particular features of advantage appear in the utilization of a fluid pressure system separate from that of the engine, self-contained in the drive mechanism, which provides both for pressure lubrication and fluid servo ratio actuation. Special features in control of the fluid circuit elements for avoidance of drive overload, for assuring lubrication under high loads, and for regulation of the degree of fluid pressure actuation for drive ratio-determining brakes and clutches. Additional features involving special forms of clutch control valving and a non-reactive selector valve system also appear, the clutch control valving consisting of plural valves, one of which is subject to engine shaft speed for prevention of overload stalling and another of which, though located in a constantly-rotating member, is counterbalanced to eliminate centrifugal force effect, and response to variations in line pressure or servo pressure variation for obtaining quick release of a loaded friction member. The ratio obtained, depends upon the numbers of teeth in these gears.

The invention as herein illustrated, utilizes two pressure control valves separate from the master ratio selector valve, in order to provide against clutch drag during shift of ratio, and to prevent engine stalling. The first of these controls only the pressure build-up on the direct drive clutch while the second is effective during both forward and reverse drive.

These valves are radially placed and rotate with the flywheel, one of which varies pressure in response to engine speed, and the other being arranged to respond to variations in pump line pressure—having its centrifugal component canceled by design of fluid pressure porting and radial spacing.

The gear group is lubricated in part thru pump line connections derived from the drive control and ratio actuation system arranged to assure pressure feed lubrication to the gears at all times when load is applied to the transmission output shaft.

The ratio actuators are of friction disc type, axially loaded by large annular pistons, and the servo cylinders are exhausted to the casing direct, when drained for drive disengagement.

The drive modification shown herein having a reduction gear unit in series behind the reverse gear which is lubricated from the pump line and control valve feed main by a direct branch tube which is removable from a convenient external point for cleaning without disturbing any of the adjacent members.

The double-planet gear group is especially made for self-adjustment of both sun gear and annulus gear for equalization of load and quiet operation.

Other features, useful results and advantages appear in the discussion and demonstration of the specification text following, descriptive of the constructions of the appended drawings in which.

Figures 1, 1A:
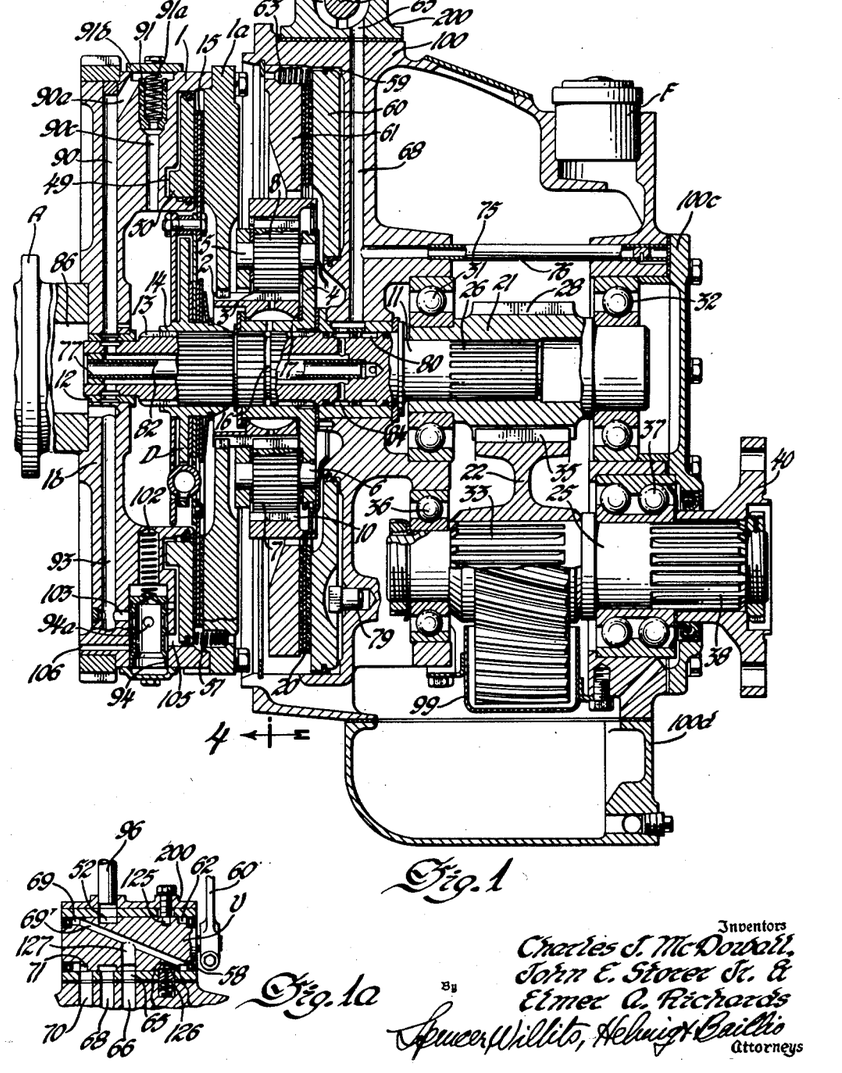
Fig. 1 is a vertical sectional elevation of one form of the construction of the invention utilizing a fixed reduction gear group in series with the main drive change gear, and built into the same housing.
Fig. 1a is a detail section view of the barrel valve at the top of Fig. 1.
Figures 4, 6, 6A, 7, 8:
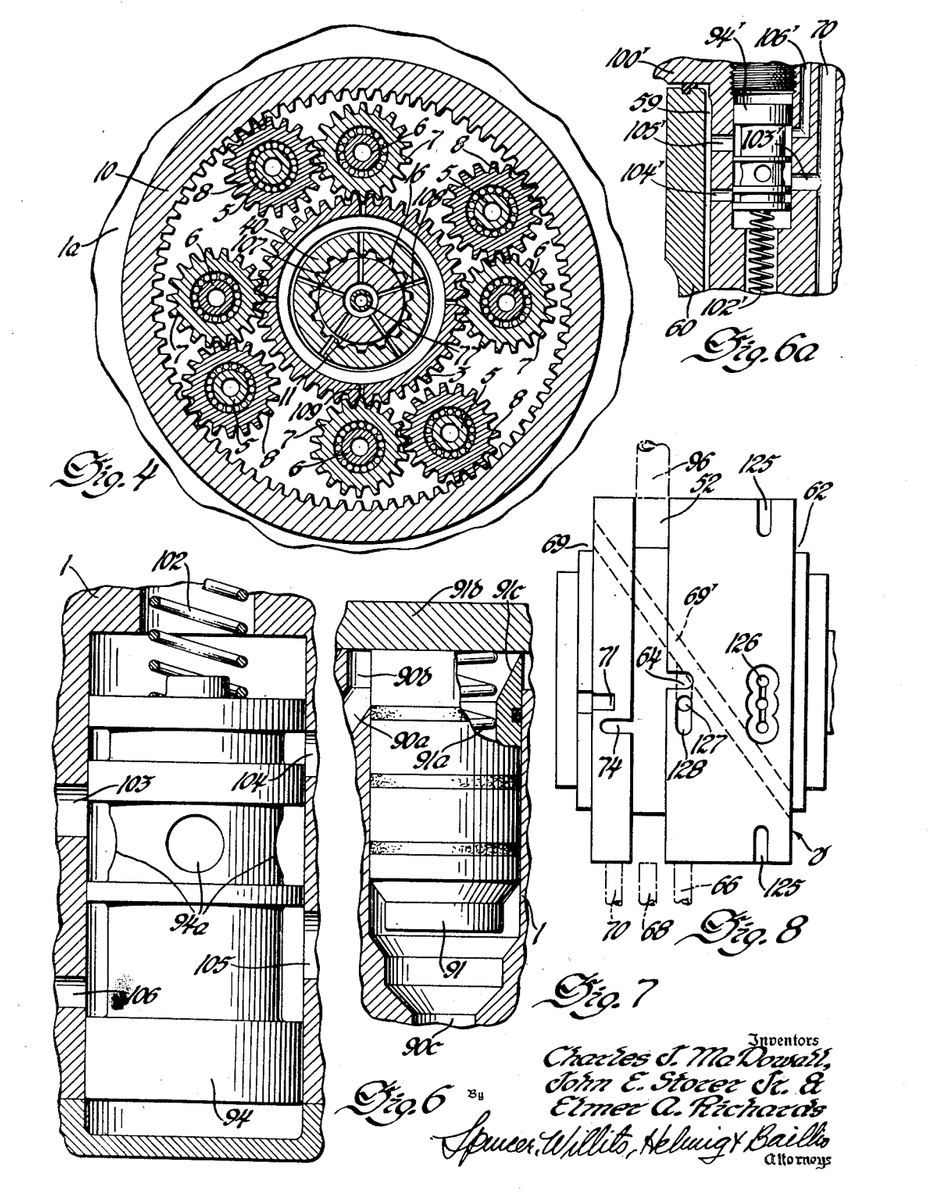
Fig. 4 is a sectional view taken at 4—4 of Fig. 1 to show the gear disposition of the ratio change drive unit and the lubrication flow pattern in this gearing.
Fig. 6 is an enlarged view of the pressure dump valve 94 of Fig. 1, for controlling the pressure acting on the direct drive clutch.
Fig. 7 is a similar view of the anti-stall valve 91 of Fig. 1.
Fig. 6a is a sectional view of a brake pressure regulator valve similar to the clutch regulator valve of Fig. 6.
Fig. 8 is a diagrammatic development view of the surface porting of the manual control barrel valve V of Figs. 1 to 3 and 5.

In Fig. 1, the engine flywheel member 1 is formed into a drum the flange portion 1a being keyed to splines 2 to sun gear 3. The carrier 4 has affixed planet spindles 5 and 6 for two meshing planets sets 7 and 8, the planets 7 meshing with sun gear 3 and the planets 8 meshing with annulus gear 10, as shown in Fig. 4.

This form of double planet arrangement has the property of providing reverse rotation if the annulus gear be held, with the load connected to the carrier. It is readily understood by reference to the sectional figure of Fig. 4. The splining of sun gear 3 to drum 1a, and the free mounting of annulus gear 10 with its brake disc permits self-adjustment for load equalization of the gear train.

The transmission output shaft 11 is piloted in the input flywheel hub 1b at 12 and is splined at 13 for the hub 14 of clutch plate 15 and at 16 for the sleeve 17 of carrier 4. Annulus gear 10 is connected to disc brake plate 20.

Power applied to sun gear 3 with load existing on carrier 4 causes the planets 7 and 8 to spin on their spindles 5, 6, and drive annulus gear 10 forwardly at an idling speed represented by a fraction in which the numerator is the diameter of the sun gear and the denominator the pitch line diameter of the annulus gear 10.

Now if clutch plate 15 be gripped to run with flywheel 1, a locking couple is established between the carrier 4 and the sun gear 3, so that the assembly of Fig. 4 runs solid, at 1-to-1 ratio, or direct drive between shafts A and 11.

With neither of clutch plate 15 or brake disc 20 engaged, the annulus 10 will idle forwardly at slow speed, as noted above.

When brake disc 20 is prevented from rotation annulus gear 10 is stopped, and the reaction upon planets 7, 8 causes carrier 4 to rotate slowly backward, driving shaft 11 reversely.

The rotation of shaft 11 is applied to gear 21 in mesh with gear 22 of offset load shaft 25, driving the latter at the reduction ratio of the gear pair 21, 22, the shaft 25 rotating reversely to whatever rotation is applied to shaft 11.

Alternate actuation or engagement of clutch 15 or brake disc 20 therefore will drive shaft 11 at 1-to-1 ratio in the same direction as the engine shaft hub 1b, with load shaft 25 actually rotating reversely for "forward drive"—and will drive shaft 11 at 1-1 in the opposite direction to engine shaft rotation, but shaft 25 will rotate in the same direction as the engine for "reverse."

Transmission output shaft 11 is splined at 26 to engage the inner portion of gearbody 21 toothed at 28 and supported in bearings 31 and 32. The load shaft 25 is similarly splined at 33 for gearbody 22 toothed at 35 to mesh with gear teeth 28, and is supported on bearings 36 and 37 in casing 100. The external stub of shaft 25 is splined at 38 for the universal drive coupling sleeve 40.

The rear cover plate 100c of casing 100 is bored to permit the sleeve of coupling 40 to pass thru, and extends upward sufficiently for removal of gearbody 21 and also shaft 11, if necessary. Removal of shaft 25 endwise permits gear 22 to drop downward whence dropping of the casing sump pan 100d permits its removal.

The gear arrangement provides a wide range of adaptability to different power installations and to different load conditions arising from varying boat loads and varying sizes and pitches of marine propellers.

By the present quick detachable shaft arrangement, a wholly different ratio pair of gears may be substituted in a given installation for special drive purposes, whereas in known commercial installations no such facility is provided.

Figure 2:
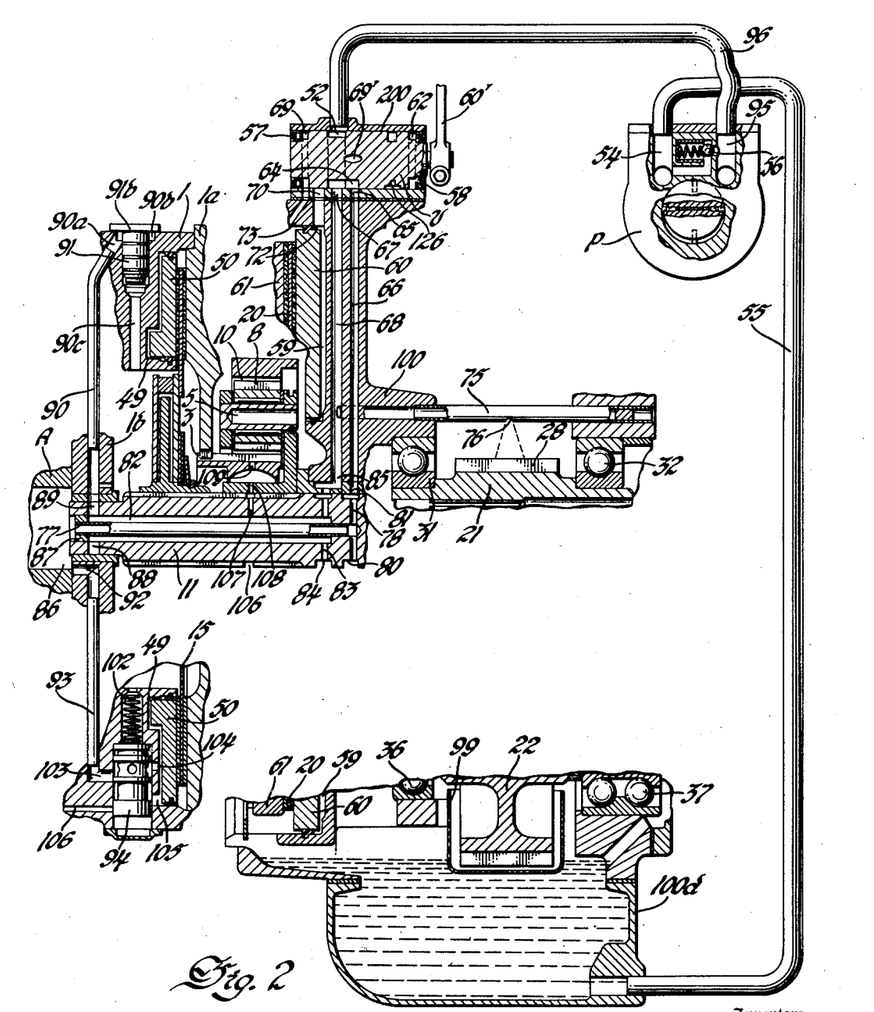
Fig. 2 is a schematic diagram of the fluid pressure system and units involved in the Fig. 1 structure, the units being generally sectioned as in Fig. 1 for clarity. The primary fluid control channels are shown side by side in Fig. 2 whereas in the actual construction they lie in line with each other at right angles to the plane of the drawing of Fig. 1. The controls of Fig. 2 are shown as for drive in forward, direct.
Figure 3:
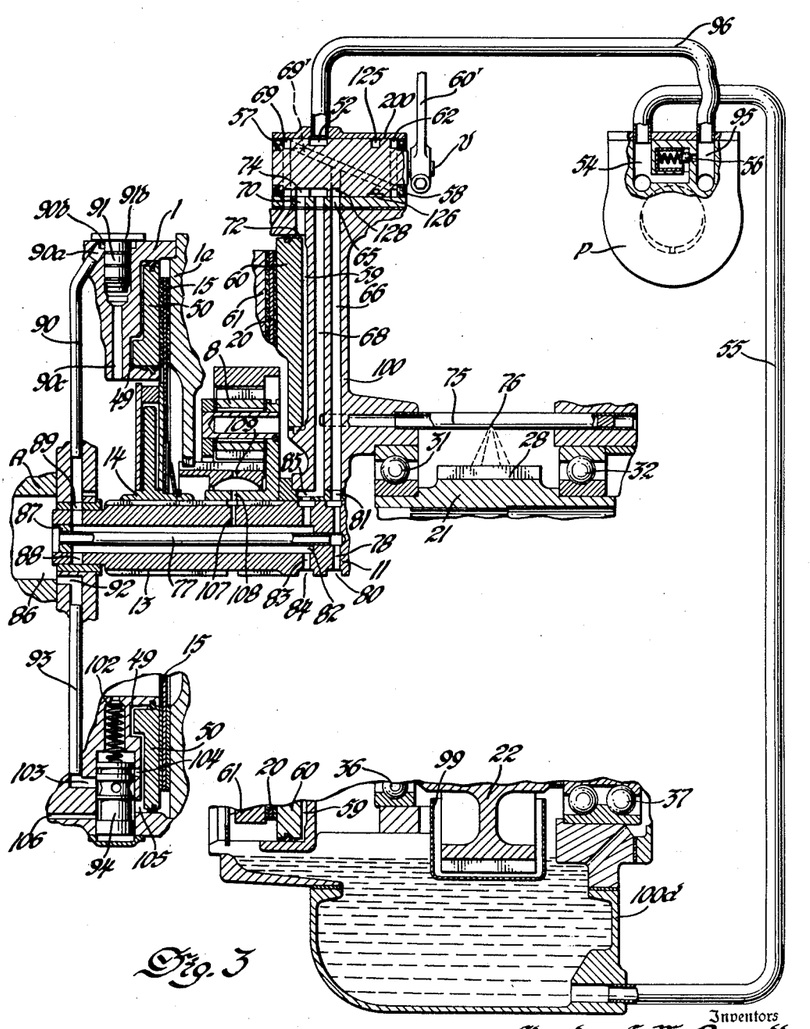
Fig. 3 is a view like that of Fig. 2 with the controls shown as for reverse drive, as distinct from Fig. 2 and from Fig. 1 in which they are shown as for neutral, or no drive.
Figures 5, 5A:
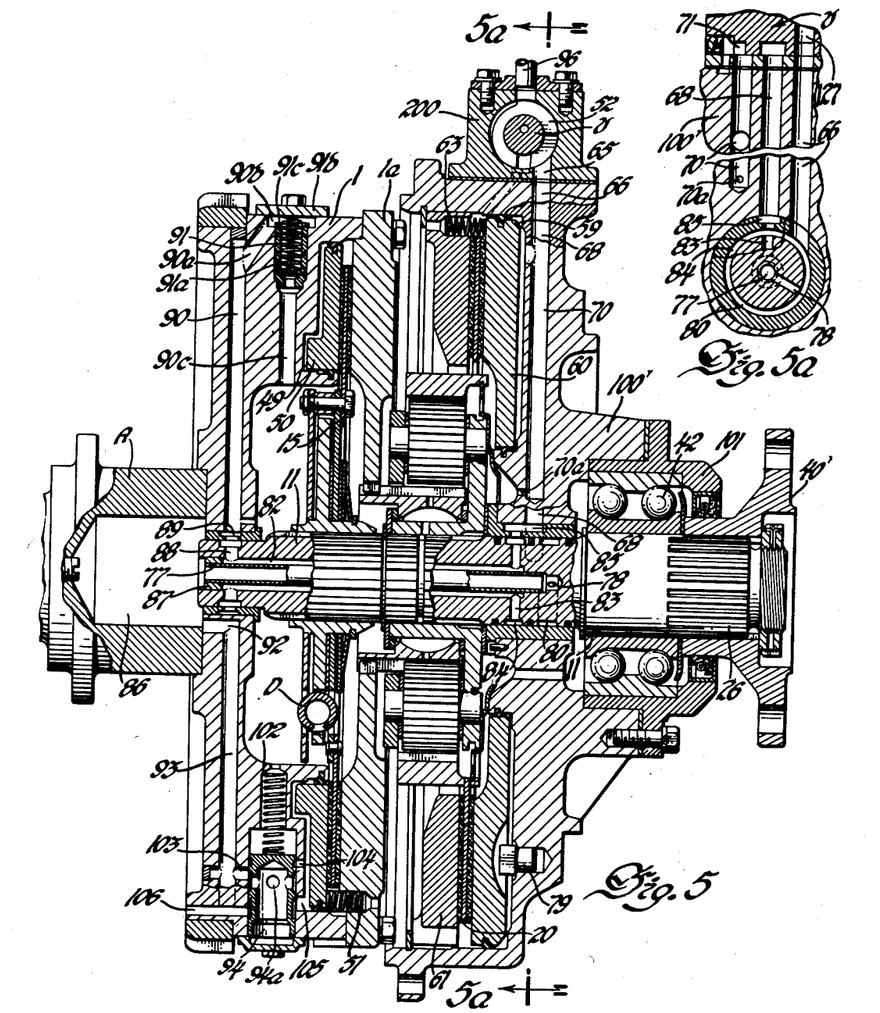
Fig. 5 is a view like that of Fig. 1 but showing the transmission output shaft as the final driver of the propeller shaft as distinct from the two-unit showing of Figs. 1 to 3 having the fixed reduction unit in the same housing. In practise, the main construction of Fig. 5 is readily converted to that of Fig. 1 by simple detachment and substitution of only a few parts.
Fig. 5a is a sectional view taken at 5—5 of Fig. 5 to show the port connections of the master valve control.

The modification drive shown in Fig. 5 has parts numbers identical with those of Figs. 1, 2 and 3, but shaft 11' has its splines 26 engaging the inner portion of output drive coupling 40', supported by double-row bearing 42 in casing 100', locked in place by collar-fitting 101. In this version of the drive, shaft 11 is the load shaft of the unit.

The flywheel 1 is formed into a large annular cylinder 49 to accommodate clutch servo piston 50, the annular piston gripping the plate 15 against the adjacent surface of flywheel web 1a when the cylinder 49 is supplied with fluid pressure.

The casing 100 is formed to provide annular brake cylinder 59 for piston 60, and removable clutch backing plate 61 locked in place by a lock ring, grips brake disc 20 with piston 60 when fluid pressure is supplied to cylinder 59.

Return springs 51 serve to release the grip of piston 50 when clutch pressure is removed, and return springs 63 perform the same operation for piston 60.

The sun gear 3 is mounted for floating movement under load, and being in contact with the meshing pinions 7 of the reduction group while being permitted to shift axially in its splines 2, tends to compensate for misalignment. Likewise the annulus gear 10 may move axially and self-adjust in the same manner. This peculiarity of the gear group provides two useful features, equalized distribution of load and self-correction for misalignment—resulting in quieter and longer-lived gears. The vibration dampener unit D is of common form, and fulfils the requirement of absorbing torque impulses over a range of torque calculated for the particular needs of the installation.

The whole unit is thoroughly lubricated for guaranteeing complete flooding and cooling of the servo and lubrication oil. The pump P is driven independently of the engine oil pump and as described herein utilizes an independent transmission oil system. It is possible to combine oil and pumping systems so as to use one oil body for both engine and transmission, and to cool the transmission oil thru the engine cooling system, but the disclosure herein operates satisfactorily without such expedients, which unless urgently needed, only increase weight and cost of the marine drive.

The clutch hub 14 is driven thru dampener mechanism D connected to the plate 15 which is gripped by piston 50 and web 1a when pressure is delivered by valve 94.

Piston 50 is annular and lies in cylinder 49 for axial motion only. Return springs 51 serve to release the grip of elements 50, 1a when fluid pressure is released.

In neutral drive position, barrel valve V is rotated so that only passage 68 delivers pump line pressure. While this is connected to space 82 and to valve 91, the normal R. P. M. of the engine is sufficiently high to prevent valve 91 from relieving the line pressure, and if the engine is raced, the excess pressure in the connecting lines is relieved by valve 56, and thru port 76 of pipe 75.

Shift of valve V from neutral to forward position connects passage 64 to port 65 to admit pressure to passage 66 and thence to space 86 thru tube 77, and via passage 92 to valve 94 for loading clutch 15.

Fig. 2 is a schematic diagram of the fluid pressure system of the invention, with the contributing units being shown in part section for illustrating the necessary flow connection paths.

The pump P, upper right is driven by the engine shaft A thru appropriate gearing and delivers output pressure to passage 95 and line 96 leading to the inlet groove 52 and port space 52' of barrel valve V, rotatable in a bore of housing 200. The pump P draws from suction passage 54 and from line 55 connected to the oil reservoir of sump pan 100d. Valve 56 dumps pump line overpressure from passage 95 to passage 54, proportionally to pressure area and spring load.

The barrel valve V fits the bore in body 200 circumferentially, is end sealed at 57 and 58, and rotated by control handle 60. It has end grooves 69 and 62 cross-connected by internal passage 69'. Input feed groove 52 is ported laterally at 64 to intersect port 65 open to passage 66 in housing 100. Port 67 of housing 200 is open to passage 68 in housing 100. Fig. 8 provides a development view of the surface of valve V.

Port 70 is laterally connected to end groove 69 by passage 71 as shown in Fig. 1a, and is open to the space 72 behind reverse-brake piston 60 in cylinder 59 formed in housing 100. Return spring 62 unloads piston 60.

With the parts as shown in Fig. 2, valve V is feeding oil pressure to passages 68 and 66 while port 70 and connecting passage 71 are open to exhaust. Passage 68 is connected laterally to pipe 75 having spill port 76 above teeth 28 of output drive gear 21 for lubrication. This figure shows the direct drive control phase of operation.

Shaft 11 is bored to accommodate smaller diameter tube 77 connected thru radial passages 78, groove 80 and gland port 81, to passage 66. The cylindrical bore space 82 external to tube 77 is connected by radial passages 83, groove 84 and gland port 85 to passage 68.

The adjacent end of the engine shaft A is hollowed out in a blind-end cylindrical space 86 open to tube 77, but blocked by plug 87 surrounding the tube. Radial passages 88 connect space 82 thru passage 89 to passage 90 leading to valve 91, located in a radial bore in flywheel 1.

Space 86 is connected laterally thru passage 92 in hub 1b to passage 93 leading to valve 94. As will be understood further in detail, valve 91 may relieve pressure in line 90 in accordance with variations in centrifugal force, and valve 94 feeds controlled pressure to direct drive clutch piston 50 in cylinder 49 formed in flywheel 1.

Valve 94 is thimble shaped and is connected to the pressure oil feed only when barrel valve V delivers pressure to passage 66, tube 77 and space 86; that is, when forward drive is desired, and not so connected during neutral and reverse drive. Valve 94 has four external bosses of fullbore diameter, and is hollow as shown in Figs. 1 and 6. The space between the second narrow boss from the top and the third is drilled thru at 94a so as to connect the interior of the valve with line 93. Spring 102 is recessed radially inward in a narrower portion of the valve bore, and presses the valve outward as shown in Fig. 1, which tendency is resisted by the line pressure from passage 93 acting inside the valve on the closed inner face area, so that if sufficient line pressure is available to actuate clutch 15, a variable regulation of pressure delivery may occur, if desired, until the valve 94 reaches its full inward position as shown in Fig. 2.

The inlet port 104 is spaced radially from delivery port 105 and commonly joined to annulus 48 of clutch piston 50.

As valve 94 moves inward to expose feed port 104, from the Fig. 1 to Fig. 2 positions the fact that line 93 and passage 103 are exposed to equal land areas of valve 94 avoids any tendency for hydraulic latch-in effect. The mass of the valve 94 and that of spring 102 would tend to oppose the line pressure action except for the fact that the radial mass of the fluid in the adjacent radial passages is so taken that the centrifugal force of the valve 94 and spring 102 is counterbalanced.

The rise of line pressure is preferred as a control factor for protecting the clutch 15 against low load slip abrasion. When sufficient pump line pressure is available to produce the desired clutch torque capacity, valve 94 permits clutch actuation when called for by the setting to forward position of handle 60' and valve V, but if for any reason, line pressure falls below that required to produce required clutch drive torque the spring 102 is so taken for calibrated force value that the port 104 is closed, (not shown in figures) opening cylinder 49 to axial relief passage at port 106.

The valve 94 of Figs. 1 and 6 serves to disengage the clutch 15 when the flywheel is rotating, under the control of the barrel valve V, and is therefore made sensitive only to drop in line pressure caused by removal of pump line pressure as valve V is shifted to neutral and reverse. Within the speed ranges of operation, valve 94 is centrifugally balanced by the centrifugal force of the oil mass ported to exert such force in opposition to the centrifugal force of the valve and spring 102.

The anti-stall valve 91 shown in detail in Fig. 7 is spring pressed at 91a generally like the valve 94 placed opposite in the flywheel 1. Under the normal load of its spring 91a, it is held inward. The retainer plate 91b seals enlarged space 90b above the valve 91 which is hollow, and pump pressure delivered to passage 90 passes thru 90a to space 90b and flows thru the hollow valve 91 to aperture 90c and to spill passage 90c open to sump 100d.

At a given low R. P. M. of flywheel 1, the centrifugal force on valve 91 and incidentally that of the spring 91a becomes effective to raise the upper edge of valve 91 into the space 90b, where the feed of 90a tends to become restricted, to raise the pressure in the system to which passage 90 is connected. At high flywheel speeds valve 91 may seal against the inner face of plate 91b. The effect of pump line pressure in passage 90 and space 90b is balanced out so that spring 91a tends to open the valve 91 to full drain independent of the pressure and opposing the centrifugal force effect. The external cylindrical wall of valve 91 is plurally grooved to promote self-cleaning and alignment, and the inner end is single-taper formed concentric with the valve bore and exhaust passage 90c. In Figs. 2 and 3, valve 91 is shown in high speed position.

Under excessive overload, so as to avoid engine stalling, valve 91 responding to flywheel speed develops inherent centrifugal force, and is connected in the circuit so as to release the pressure of either of clutch piston 50 or brake piston 60, at below a given R. P. M. of flywheel. This arrangement protects the engine against stalling under load.

In Fig. 6, valve 94 is shown in blocking position, the port 103 feeding thru holes 94a in the groove between the central lands to the interior of the thimble-shaped valve 94, which being open at its lower end, tends to rise with the line pressure acting against spring 102. In the position shown the clutch cylinder ports 104, 105 are open to exhaust at port 106.

As the valve 94 rises, port 104 is opened to line pressure and exhaust port 106 is closed, trapping line pressure in the clutch cylinder 49, to load piston 50 and grip plate 15. During this interval the force of spring 102 may be so calibrated if desired, so that an extended pressure rise interval may be had, so that the clutch 15 is brought to engagement gradually.

In practise we find that since the clutch cylinder passages are exposed by drainage prior to engagement, to atmosphere, the building up of loading pressure is obtained by a primary filling action inward which drives occluded air ahead of it before any considerable degree of pressure is felt on the clutch plates, at the same time the spinning of the oil body creates a rise of pressure in the peripheral zones, then in the inward radial zones, which sequential action adds to smoothness of clutch engagement. We prefer, however to have the device pass thru this interval rapidly, since at small or zero R. P. M., of load shaft 11, the clutch 15 cannot be damaged by quick torque application, and our preferred method facilitates ready maneuvering of a boat in close quarters. It should be remembered that valve 91 operates to relieve clutch pressure whenever the load torque pulls engine speed down below a predetermined flywheel speed.

The maneuvering facility of valve 94 is best appreciated in shifting out of forward, preparatory to coming alongside in a rough seaway, when it may be momentarily urgent to stop forward way by cutting in a few reverse revolutions of the propeller shaft.

A boat with forward way tends to drag the propeller into forward rotation and it is possible that if a long time interval is needed to break the clutch connection with the engine, the boat will ram the slip or dock before sufficient reverse R. P. M., can be applied to the propeller to bring the boat to rest on the water, or to reverse its motion.

Our control meets this test neatly and effectively, since the instant barrel valve V connects clutch feed passage 66 to exhaust groove 128 of Fig. 8, the passage 106 drains the cylinder 49, and springs 51 unload the clutch 15.

The release of oil from the peripheral zones creates a subatmospheric condition which facilitates release of the pressure plate.

It should be observed that a predetermined pressure is required to obtain engagement by action of valve 94, consequently when valve 91 reduces the available pressure below that level, disengagement thereupon occurs.

Valve V may be rocked to alternate neutral and forward positions for maintaining slow way on a boat operated in narrow sea room areas, the clutch 15 then delivering small pulses of torque to the propeller shaft to steady the boat and avoid drift effect.

The same type of operation may be carried on in reverse maneuvering. It is apparent that one may use a third regulating valve similar to valve 94 and operating in the connection of passages 70, 71, 59 for controlling the feed to the reverse brake piston 60, if the no-stall characteristic needs to be accentuated in reverse shift. To achieve this application of the invention a corresponding valve 94' located in the housing 100, ported like valve 94 may be used to control the feed to cylinder 59. We do not find the third valve 94' to be needed in ordinary commercial boat practise.

Referring back to the pressure feed system of Figs. 1 to 3 and 5, passage 90, space 82 and passage 68 are connected to the groove 52 of valve V at all times, therefore the degree of pump line pressure in 96 is always conditioned for either direct clutch or reverse brake loading by the centrifugal action of valve 91. Consequently, whether in forward or reverse drive, valve 91 serves to relieve all of the line pressure the instant flywheel speed falls off below a given minimum, immediately unloading either clutch 15 or brake 20. It should be remembered that all common oil pumps exhibit variable pressure phenomena in their low-speed ranges, and in acceleration to normal operation condition go thru a rising pressure cycle. The present invention, in use with a defective or badly worn pump which is leaking and not furnishing proper oil pressure with speed, provides safeguards both against inadequate pump capacity for given flywheel speeds, and against damaging slip due to excess load for a given speed.

The development diagram of Fig. 8 is best compared with Figs. 2 and 3 for clear understanding of the control operation. The grooves 69 and 62 are shown at either end, cross-connected in dash line by passage 69'.

The face of the barrel valve V is recessed at 125 for cooperating with a locating guide screw-pin shown, Fig. 1a and has a recess at 126, indented or dimpled in the three angular positions for forward, neutral and reverse, to accommodate a common spring-loaded poppet 126 of Fig. 1a.

The main feed channel or groove 52 is side-ported at 64 to feed forward drive pressure to clutch 15 and is side-ported at 74 to feed pressure to the reverse cylinder 59.

The end groove 69 is side-ported at 71 to intersect the port 70 of Fig. 3 when neutral is established. The internal passage 69' connecting the end ports 69 and 62 is radially ported at 127 into surface groove 128 which connects with passage 63 when the valve V is set in either neutral or reverse. Ports 71, 70 also intersect in "forward" shift.

Although the operation of the present invention should be wholly clear from the foregoing descriptions, we present below a summary of the operation sequences for further clarity.

Upon starting the engine, with handle 60' of valve V in neutral position, flywheel 1 rotates up to normal engine idling speed and pump P delivers rising pressure to line 96, which passes thru groove 52 to passage 68, oil pipe 75, spaces 82, 76 and passage 90. Valve 91 is preferably actuated at this point to block relief of pressure as shown in Figs. 2 and 6, so as not to dump the connecting system at exhaust passage 90c. Valve 94 remains in its outward position, held by spring 102, since passage 66 is open to exhaust at 128, and there is no pressure to shut off exhaust 106 or to open port 103 to port 104 and cylinder 49.

As the operator "revs up the engine," flywheel 1 will have accelerated to a speed sufficient to cause valve 91 to move outward against spring 91a and close exhaust 90c, so that the overpressure trapped in the system may blow off at pump relief valve 56.

Shift of lever 60' to forward connects groove 52 thru side port 64 to port 65 leading to passages 66, 77, 86 and 93 to feed port 103 of valve 94. If valve 91 is already closed due to R. P. M. of member 1, the line pressure will shift valve 94 rapidly to admit pressure to port 104 and load the clutch piston 50 quickly at high pump pressure. If valve 91 is open when valve V is moved to forward position, the available line pressure will be less until increased R. P. M. of member 1 closes valve 91, hence there will be a longer time interval before clutch 15 is fully loaded.

With these characteristics, the boat operator has a choice of bringing the clutch 15 to engagement very quickly under high capacity load, or slowly under a more gently rising clutch loading pressure, depending upon the throttle position controlling the speed applied to flywheel 1. At advanced throttle the clutch comes in quickly under maximum capacity load, and at retarded throttle, it comes in slowly under a lesser capacity load force. It is preferred to obtain these effects in the manner described than to rely upon a variable pressure effect from the servo pump alone. In practise we prefer to operate the pump P so as to provide a reasonably stable line pressure in passages 95, 96, 52 and 77 and to apply variable pressure actuation effects thru the porting and valving described.

Rocking of valve V from neutral to the reverse position of Fig. 3 connects groove 52 thru port 74 to brake cylinder 59. End port pressure in 69 is equalized by cross passage 69' to end port 62, avoiding axial jamming of valve V. This provides a proper exhaust outlet for leakage from groove 73 to the space 62 between the adjacent end of valve V and the seal.

In practise, passage 70 extends downward as in Fig. 1a, opening into oil-feed hole 70a to the right of carrier 4 to provide additional gear lubrication during reverse gear drive.

Space 82 external to tube 77 is connected thru passages 107, 108, and 109 for feeding lubricant to sun gear 3 drilled plurally and radially as shown in Fig. 4 to deliver lubricant under pressure to the gear teeth.

Shroud 99 for the lower portion of gear 22 assists in controlling the flow of oil to the top of the unit, and avoids sump churning.

Shift from forward to reverse may be made at any time without dwell in neutral.

Should such a shift be necessary, movement of barrel valve V to reverse transfers servo pressure from clutch passage 66 to reverse brake passage 70, and connects the various clutch line connected passages to exhaust. In practise, we find it almost impossible to have a drive condition in which torque, even momentarily is supported simultaneously by clutch 15 and brake 20, because of the rapidity of draining of clutch cylinder at passage 106.

It does not appear necessary to reduce the throttle to below closure speed for valve 91, to make the direct-to-reverse shift, but if that is done, there is noticed a slight tendency for lengthening of the time in which brake 20 takes hold.

If in starting up, one has to drive the boat in reverse, motion of handle 60' from neutral to reverse positions delivers pressure from groove 52 of valve V to side passage 74 and port 70 whence it passes to cylinder 59 of brake piston 60. Valve 91 may or may not control the brake loading fluid pressure, depending upon the R. P. M. of the engine, as described above in connection with the initial clutch loading interval.

Shift from reverse to neutral is obtained by continuing to deliver line pressure to valve 91 while connecting reverse cylinder 59 to exhaust at 70, 71.

Side port 71 connected to end groove 69 in Fig. 8 is extended rotationally to a position opposite side port 64 of groove 52 so that reverse line drain connection is also provided in forward gear as in neutral position of valve V. A special relief passage connects the peripheral brake plate space to end groove 69 of valve V as indicated in Fig. 2, to facilitate clutch release by relief of trapped oil, which is quickly spent by the centrifugal force of the oil.

While it is appreciated that common use of a transmission oil body for both servo and lubrication purposes is generally old, it will be appreciated that the present invention provides special lubrication facilities for the gearing by direct feed from the clutch and brake actuator passages thru pipe 75, outlet 76, passages 73, 74, 107, 108, 109 and the other connections shown.

This system possesses elements of novelty in combinations not heretofore provided—so that when the servo system is energised by the barrel valve V, and extra supply of lubrication oil is added to that normally available. The shroud arrangement at 99 with respect to member 22 provides a metered lift of lubricant to the reduction gearing of Figs. 1 to 3, and delivers the excess oil thru passages not shown, to the sump 100d.

It was stated preceding that a valve 94' could be used in the feed line to cylinder 59 for the reverse brake 20. This is shown in Fig. 6a, the prime numbers corresponding to valve and valve port elements of Figs. 1 to 3, 6 and 8. Since a full description is given above for valve 94, it is not deemed necessary to re-describe the operation of valve 94' except to state that since the casing 100 does not revolve, the valve pressure force may be calibrated exactly by spring 102' for its operative responses.

In the foregoing description we have stated in considerable detail the many and various advantages to be derived from the novel features of the construction herein described. It is not deemed necessary to repeat them, except to emphasize the durability and fool-proof character of the invention, and its ability to handle heavy torques in a mechanism occupying a very small space. The device of the invention has been built and operated satisfactorily under heavy loads continuously applied, and all experimental tests verify the successful nature of the various features as combined in the invention.

It is obvious that one skilled in the art and equipped with the teachings herein may build a counterpart mechanism in which many small modifications and variations will occur, but it is believed proper to state at this point that the specific disclosure embodied in the present description and drawings is only by way of example, and that the invention herewith is only limited in scope by the appended claims given below.

We claim:

1. In power transmission actuation and control systems the combination of an engine-connected clutch drum, a cylinder formed in said drum, a fluid-pressure-actuated friction clutch having an actuating piston recessed in said cylinder, a fluid pressure producing pump, a conduit supplied by said pump leading to said cylinder, an exhaust conduit leading from said cylinder, a valve responsive to the pressure in said first conduit for admitting said pressure to said cylinder, and a second valve rotating with said drum arranged to permit free flow of fluid between said conduits and subject to centrifugal force for blocking the said flow between said conduits to create a building-up of the pressure delivered to said cylinder by said pressure-responsive valve in proportion to the speed of rotation of said drum, and thereby cause said clutch to transmit torque, by force applied to said piston.

2. In the combination set forth in claim 1, the sub-combination of a yielding element effective to provide a predetermined resistance to the pressure actuation motion of said first-named valve and a second yielding element rotating with said second named valve effective to oppose the action of centrifugal force upon said second valve in order to establish a predetermined low speed value at which said second valve will open, and of a manually operable valve in said first named conduit effective to cut off the feed of said pump to said cylinder and thereby cause said pressure responsive valve to relieve pressure from said cylinder thru the action of said first yielding element.

3. In the combination set forth in claim 1, the sub-combination of a manually controlled pressure directing valve in said first conduit operative to deliver said pump pressure to said cylinder or to cut off said pump pressure therefrom, at will.

4. In marine reverse gearing, an engine shaft, a load shaft, a clutch mechanism adapted to connect said shafts directly, a planetary gear train adapted to connect said shafts indirectly, said train including a sun gear constantly rotating with said engine shaft, an annulus gear, a planet carrier constantly rotating with said load shaft, a pair of meshed planet gears supported on said carrier dimensioned such that one of said meshed pair of meshes with said sun gear and the other with said annulus, a brake mechanism adapted to arrest rotation of said annulus, a drum rotating with said engine shaft enclosing said clutch mechanism and connected to drive said sun gear, a housing supporting said load shaft, power actuator devices for each of said mechanisms consisting of actuator pistons, one located in a cylinder of said drum and the other in a cylinder formed in a web of said housing adjacent said gear train, a fluid pressure supply, a valve located external of said housing adapted to deliver supply pressure selectively to actuate said pistons alternately, and a system of delivery passages connecting said devices to said valve consisting of one path in said housing continuous with a passage in said load shaft leading to a feed passage in said drum for said clutch cylinder, and a second path in said housing leading directly to the cylinder of said second named device.

5. In marine reverse gearing providing direct coupled drive between power and load shafts and reverse reduction drive therebetween, the combination of a power-connected drum and a propeller shaft, of driving means constantly connecting the drive of said load and said propeller shafts, a clutch mechanism enclosed in said drum for connecting same directly to said load shaft, a planetary gear train having an actuable reaction member adapted to provide a reverse reduction drive between said drum and said load shaft, said train consisting of a sun gear rotating with said drum, a planet carrier rotating with said load shaft, an annulus gear adapted to be braked by said reaction member, and planet gearing supported on said carrier meshing with said sun and said annulus gears, the arrangement of said planet gearing consisting of a pair of meshed planet gears one of which meshes with said annulus and the other of which meshes with said sun gear, and controls for said mechanism and said member operative to cause graduated initial drive and direct connection of said drum and said shaft by said mechanism and operative to cause alternate actuation of said member for establishing reverse drive between said drum and load shaft.

6. In marine gear drives, driving and driven shafts, a friction clutch adapted to connect said shafts, an actuating mechanism for said clutch adapted to be actuated by fluid pressure for establishing the drive between said shafts, a reverse gear train adapted to transmit reverse torque between said shafts, a torque-establishing member for said train having an actuating mechanism adapted to be actuated by fluid pressure, fluid pressure actuators for each of said actuating mechanisms, pressure feed conduits leading to said actuators, a pressure supply system arranged to provide full actuating pressure for said clutch and for said actuators for causing delivery of predetermined forward or reverse driving torques between said shafts, a pressure directing valve operative for selective connection of said pump supply system with said feed conduits, and pressure responsive valving in said system operative to respond to the existing pressures in said conduits for maintaining the actuating action of said actuators upon said mechanisms at all pressures above given pressures corresponding to the required predetermined drive torques, and operative to respond to lower pressures within said conduits for relieving the actuating action of said actuators, the action of the pressure responsive valving resulting in the avoidance of partial loading inadequate to prevent continued slip of the particular mechanism selected for actuating by said directing valve.

7. In a marine reverse gear an engine shaft, a load shaft, a gear train embodied in said gearing consisting of a sun gear rotating with said engine shaft, a gear carrier rotating with said load shaft, a meshing planet gear pair supported for rotation on the carrier, one of said planet gears of said pair meshing with said sun gear, an annulus gear meshing with the other of said planet gear pair said gear train being arranged to provide reverse drive reaction in said train, friction members one of which is operable to establish direct drive between said shafts and another of which is operable to establish reverse drive by stopping said annulus gear, fluid pressure actuated mechanisms each operative to load one of said members for establishing said drives, a fluid pressure supply pump with pressure connections leading to each of said mechanisms, control valving for alternately directing the fluid pressure of said pump selectively to said mechanisms for alternate actuation thereof, a pressure regulating valve responsive to the pressure of one of said connections and thereby operative to release the pressure acting on one of said members at a predetermined low pressure of said connection, and a second valve operative in response to a predetermined low speed of said engine shaft to release the pressure acting on either of said members.

8. In a marine reverse gear unit consisting of fixed ratio gearing providing forward and reverse torque paths between power and load shafts, equipped with forward drive establishing mechanism operable at one speed ratio and equipped with reverse drive establishing mechanism operable at another ratio thru said gearing, an engine shaft driving said powershaft, a transmission shaft of said gearing adapted to drive said load shaft, a non-rotating gear casing for said gearing, a fluid pressure servo and lubrication pump driven by said engine shaft, a selector control valve mounted on said casing connected to the output of said pump, forward and reverse gear elements included in said gearing, for providing said torque paths, supporting bearings for said elements located in said casing, a friction clutch for connecting said engine shaft to said transmission shaft to establish said forward drive torque path, an actuator for said reverse drive-establishing mechanism and a second actuator for said friction clutch, said actuators including separately operable pistons for loading said mechanism and said clutch, cylinders for said pistons, lubrication passages for said gearing elements, conduits in said casing connecting said control valve with each of said cylinders, and branch feed connections leading from said conduits to said gearing lubrication passages and to said fixed ratio gearing operative to deliver gear lubricant from said pump in accordance with the presence or absence of actuating pressure in said conduits as selected by said control valve.

9. In power transmission control devices, an engine shaft and a transmission shaft, a change speed transmission having plural input power connections to said engine shaft, one of which drives a constantly meshed gearing train adapted to provide reverse drive of said transmission shaft, the other of said connections constituting a friction clutch for connecting said shafts, a reverse drive-establishing mechanism for said gear train and an actuating mechanism for said clutch, said mechanisms each including friction members to be actuated, a fluid pressure supply system for operating said mechanisms consisting of a supply pump, fluid pressure actuators for said mechanisms and conduits adapted to connect the actuators to the pump, devices for controlling the drive of said transmission consisting of valving located in said conduits which valving includes pressure-regulating valves automatically operative to govern the degree of pressure acting in said actuators, and a selector valve connected to said pump and said conduits operative to select actuation of one or the other of said actuators, operative to control the period of action of said pressure-regulating valves, and further operative in one selected position to cause release of drive by both said mechanisms.

10. In the combination set forth in claim 9, the further combination of a valve included in said pressure regulating valves and responsive to the varying degree of actuating fluid pressure in one of said conduits, said pressure responsive valve being operative to admit pressure to one of said fluid pressure actuators or to relieve the pressure therefrom, said selector valve being rotatable to positions in which it is effective to relieve pressure from or to deliver pressure to said conduits, and of manually-operable controls for said devices operative to rotate said selector valve and effective to cause said fluid pressure responsive valve to relieve the pressure of said selected actuator when said rotatable selector valve is set to relieve pressure from one of said conduits.

11. In the combination set forth in claim 9, the sub-combination of said valving including a centrifugally operable valve operative to vary the pressure in said conduits and subject to the speed of said engine shaft, said centrifugal valve being effective to set aside a selected delivery of pressure by said selector valve to one of said conduits leading to one of said actuators and effective thereby to limit the selective drive-controlling action of said selector valve at speeds of said engine below a predetermined minimum speed.

12. In power transmission controls, an engine shaft and a transmission output shaft, a change-speed gearing having plural input power connections to said engine shaft for driving said output shaft, said gearing containing a train of reverse drive gears, said connections including a friction clutch member arranged to establish the drive of said output shaft from said engine shaft, a drive-establishing friction member for said reverse drive train, fluid pressure-operated actuating mechanisms for each of said members, a fluid pressure supply, a fluid pressure delivery system fed by and connected to said supply and including valving adapted to control delivery of the fluid pressure of said supply to said mechanisms for causing operation thereof, pressure feed connections between said valving and said mechanisms, pressure regulating valves in said valving and controlling the pressure in said connections and made effective by the pressure of said supply and by rotation of the said engine shaft, a pressure operated piston adapted to apply driving engagement to one of said mechanisms for loading one of said members and responsive to the controlled pressure provided by said regulating valves, a device for providing a predetermined resistance to the rise of fluid pressure applied to said piston, and a drive-selecting control valve of said control-system valving connected to deliver actuating pressure to said feed connections and to said shift actuators so that said regulating valves determine the degree of loading actuation of the said mechanism upon the said member by said piston acting against the device, during said driving engagement.

13. A power transmission comprising an engine shaft, a driven shaft, a change-speed transmission adapted to connect said shafts having plural input power connections, two friction members for selectively establishing drive between said shafts, said transmission providing multiple power-delivering paths between said input power connections and said driven shaft; a fluid pressure control and actuation system for said transmission including actuators for said friction members, a pressure producing pump, conduits connecting said pump with said actuators, valving in said conduits subject to the speed of said engine shaft for automatically controlling the actuation of said friction members by said actuators, fluid-pressure-directing valving operative to direct fluid pressure selectively thru said conduits to said actuators, and a pressure-responsive valve effective to control the effect of said valving for providing automatic uncoupling of one of said members in accordance with predetermined lowering of the delivered pressure of said pump.

14. In the combination set forth in claim 13, the sub-combination of said directing valving being controlled by manually-operable mechanism, and said fluid pressure being further subject to the action of said pressure responsive valve in providing changes in the establishing of the drive from one of said members to another.

15. In the combination set forth in claim 13, the sub-combination of a line pressure regulating valve for said pump, of manually-operable control mechanism for said valving and of a fluid pressure circuit of said system connecting said member-actuators, pump, conduits, valving and said regulating valve, operative so as to provide changes in said actuator pressure other than the pressure initially selected by said control mechanism and provided by said pump.

16. In a variable speed ratio power transmission including gearing adapted to transmit drive in forward and reverse directions between driving and driven shafts, a pair of controllable torque-establishing members for providing drive connections between said shafts at one-to-one forward drive and at reduced reverse speed ratio thru said gearing, a fluid pressure supply system including a pump made operative by rotation of said driving shaft, actuators connected to said system operable by said fluid pressure for controlling said members, an automatic centrifugal device for regulating the degree of actuation of said actuators, and automatically operable valving responsive to a given effective pressure of said supply system for directing said fluid pressure to said actuators and operable for relieving same from said actuators when said effective pressure drops below a predetermined value.

17. In the combination set forth in claim 16, the sub-combination of said drive connecting members including individually actuable actuating mechanisms for providing said drive connections, and of a manually-operable valve operable to control connection of said pump with said actuators, said centrifugal device and said valving.

18. In the combination set forth in claim 16, the sub-combination of actuator conduits of said system, of said centrifugal device being driven by said driving shaft and of pressure connections joining said centrifugal device with said conduits for connecting said supply system with said fluid pressure operated actuators.

19. In the combination set forth in claim 16, the sub-combination of manual control apparatus, and of a selector valve operative to initiate the fluid-pressure-responsive action of said automatic valving and further operative to provide a choice of speed ratio of drive between said shafts as determined by the said members.

20. In the combination set forth in claim 16, the sub-combination of control apparatus for said valving operative to initiate the fluid-pressure response action of said valving and subject to the overruling action of said centrifugal device.

21. In the combination set forth in claim 16, the sub-combination of driving drum fastened to said driving shaft and acting as a housing for one of said drive connections and said members, of reciprocable elements of said actuators effective to cause one of said connections to drive while disengaging another of said connections, and of said automatic centrifugal device consisting of a valve mounted in said drum, responding to the speed of said drum and effective to control the actuation of a member connection made effective to drive by one of said actuators.

22. In the combination set forth in claim 16, the sub-combination of said torque-establishing members including friction discs loaded by said actuators actuable for selective coupling of said shafts with drive-connecting elements of said members, and of a pressure directing valve connected between said pump and said actuators operative for determining of shift of said members to forward or reverse position under said fluid pressure actuation, said device and said valving being effective to provide graduated coupling of the torque of said shafts by said members with said discs and said elements.

23. In a forward and reverse gear drive for marine power plants, the combination of a driving shaft, a driven shaft, a change-speed transmission adapted to provide plural drive connections between said shafts, gearing included in said transmission for driving said driven shaft reversely from said driving shaft, thru one of said connections, torque-establishing members of said connections alternately operable for selectively connecting the said shafts for forward or reverse drive, loading mechanisms for each of said members, a fluid pressure supply system having fluid pressure actuators for each of said mechanisms, a pressure producing pump driven by one of said shafts and conduits adapted to connect said pump with said fluid pressure actuators, automatic valves in said conduits effective to regulate the operation of said mechanisms by said fluid pressure actuators, one of said valves responding to the speed of said driving shaft, valving controlling the pressures delivered by said conduits and directing same to said actuators, and a fluid-pressure-operable valve included in said automatic valves and responding to the effective pressure delivered by said pump to said conduits for establishing at least one of said driving member connections between said shafts, or for disconnecting the drive of said member in response to a predetermined lower pressure acting upon said valve.

24. A power transmission device for providing selective automatically-connected drive between driving and driven shafts, said device including plural friction members adapted when actuated to establish drive between a driving shaft and a driven shaft at two different drive ratios, a fluid pressure supply system for said device fluid pressure actuators for said friction members fed by passages of said supply system and controlled by a speed-responsive valve connected to said system, said valve being effective to control the period of actuation of said members by said actuators, selector valving connected to said passages and movable for initiating the actuation of or releasing of said members, and a valve controlled in accordance with the effective pressure of said supply system for determining the actuation period of at least one of said members.

25. In the combination set forth in claim 24, the arrangement and operation of said supply system, said speed and pressure responsive valves, said selector valving and said supply and actuators in the fluid connecting circuit being such that for given low speeds of said speed-responsive valve, the said fluid pressure actuators are rendered ineffective to establish drive by said members.

26. In the combination set forth in claim 24, said power transmission device including gearing, special lubrication channels for said gearing connected to said selector valving and fed from said supply system conduits during the interval when said selector valving is positioned to select drive thru said gearing.

27. In the combination set forth in claim 24, a driving drum fixed to said driving shaft, fluid pressure passages in said drum leading to a cylinder enclosing a piston of said actuators, and bores in said drum connected to said passages, said bores accommodating said speed responsive valve and accommodating said fluid pressure-operable valve.

28. In the combination set forth in claim 24, a transmission driving drum fixed to said driving shaft, a cylinder and piston for said actuators located in said drum, said speed responsive valve being located in a bore of said drum operatively connected with said cylinder and said pressure-responsive valve being located in a second bore of said drum likewise operatively connected with said cylinder and said last-named valve being counterbalanced against response to centrifugal force created by rotation of said drum.

29. A power transmission device comprising a power input shaft, a power output shaft, a change-speed mechanism adapted to provide selective forward or reverse speed ratio drive between said shafts thru plural drive trains therebetween, a plurality of selectively actuable friction members for establishing connecting of said shafts thru said trains, fluid pressure actuators for effecting the loading of said members including an actuating piston and cylinder for one of the members, a fluid pressure supply pump adapted to provide pressure for said actuators, a speed responsive valve for controlling the pressure delivered by said pump to said actuators, a manual control, a second valve for modifying the delivering action of said first-named valve in accordance with movement of said manual control, and valving for varying the loading effect of said fluid pressure actuators upon said one of said friction members, said valving including a valve responding to predetermined changes in the pressure supplied to said actuators, said latter valve being operative to increase the said loading effect above a given pressure acting upon it and to diminish said loading effect at a pressure less than said given pressure.

30. A forward-and-reverse marine gear unit of the epicyclic type having a power-input sun gear, a carrier, a set of meshing double planet gears supported on the carrier, one of which is meshed internally with said sun gear, a load-shaft connected to said carrier, an annulus gear meshing internally with the other of said double planet gears and effective when braked to cause said carrier and said shaft to revolve in reverse, supports for said sun and annulus gears operative to permit equalizing load adjustment of said sun and annulus gears with respect to said planet gears, braking mechanism effective to brake the rotation of said annulus gear, during which interval said equalized load adjustment occurs, said supports consisting of spline drive connections for said sun gear and of a brake plate attached to said annulus gear and arranged for limited axial motion between axially fixed stop elements.

31. In power gear units, a power shaft and a load shaft, a gear train arranged to transmit torque between said shafts including an annulus gear and disc braking mechanism means therefor, a driving drum connected to said power shaft and constantly driving a sun gear of said train, a clutch plate and hub mounted to rotate with said driven shaft and arranged so as to be housed within said drum, a disc actuator mechanism for said clutch plate for gripping same to said drum, a planet gear carrier of said train fixed to said driven shaft, meshing sets of planets of said train spindled separately in said carrier having an inner set meshing with said sun gear and an outer set meshing with said annulus, and supporting structures for said sun gear and said annulus gear operative to permit equalization of tooth load on either gear during an interval when said clutch actuator mechanism releases said plate and said braking mechanism stops rotation of said annulus gear, said means consisting of spline drive connections for said sun gear and of axially loaded stop elements for said disc means.

32. In the combination set forth in claim 31, the sub-combination of fluid pressure operated actuators for said mechanisms consisting of axially movable pistons and of an arrangement of said supporting structures permitting axial motion of said clutch plate and said braking disc means when the fluid pressure operated actuators are energised for loading either of said disc mechanisms.

33. In a reverse gear drive of the planetary type for marine use, the combination of an engine shaft, a load shaft, a clutch consisting of a friction member adapted to be gripped by a loading mechanism actuable to cause said clutch to connect said shafts directly, a planetary gear train adapted to provide reverse drive between said shafts consisting of a sun gear fixed for constant rotation with said engine shaft, of an annulus gear, a pair of meshing planet gears one of which is dimensioned to mesh internally with said sun gear and the other of which is dimensioned to mesh externally with said annulus gear, of a carrier for said planet gears fixed for rotation with said load shaft, a brake mechanism for said annulus gear, power actuators for loading said mechanisms, selectively operable controls effective to alternate the loading action of said actuators upon said mechanisms, and of a regulating device for said actuators effective to establish variable loading actuation of said clutch mechanism when said controls select said power actuation for said clutch mechanism.

34. In the combination set forth in claim 31, the sub-combination of bearings for the support of said load shaft in said housing, and of lubrication passages leading to said bearings, said passages being fed by the pressure delivered by the said valve to said first-named pressure delivery path.

35. In a marine gear control for a power transmission having a direct drive clutch between input and output shafts, a clutch loading mechanism for same, and having a reduction gear drive train adapted to connect the said shafts with an energisable friction member for establishing the drive of the said train, the combination of a fluid pressure actuation and control system for the said clutch mechanism and said friction member consisting of a fluid pressure actuating supply pump, of fluid pressure operated actuators for each clutch mechanism and said member, feed conduits leading to said actuators, of a fluid pressure directing valve movable to deliver the pressure of said pump alternately to said actuators thru said conduits, and of a valve adapted to respond to the presence or absence of pressure in either of said conduits and in the absence of said pressure to connect the said conduits to exhaust.

CHARLES J. McDOWALL.
JOHN E. STORER, Jr.
ELMER A. RICHARDS.

REFERENCES CITED

The following references are of record in the file of this patent:

UNITED STATES PATENTS

| Number | Name | Date |
|---|---|---|
| 1,653,262 | Dickson | Dec. 20, 1927 |
| 2,018,014 | Fahrney | Oct. 22, 1935 |
| 2,361,357 | Schmitter | Oct. 24, 1944 |
| 2,370,484 | Nabstedt | Feb. 27, 1945 |
| 2,418,455 | Banker | Apr. 18, 1947 |

FOREIGN PATENTS

| Number | Country | Date |
|---|---|---|
| 496,466 | Great Britain | Nov. 30, 1938 |